(12) United States Patent
Paielli

(10) Patent No.: US 6,384,721 B1
(45) Date of Patent: May 7, 2002

(54) BRAKE WEAR SENSOR

(75) Inventor: Perry M. Paielli, Brighton, MI (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/774,958

(22) Filed: Jan. 31, 2001

(51) Int. Cl.⁷ ................................................. B60Q 1/00
(52) U.S. Cl. .................. 340/454; 340/453; 188/1.11 R; 188/1.11 W; 188/1.11 L
(58) Field of Search ................................ 340/453, 454; 188/1.11 R, 1.11 W, 1.11 L

(56) References Cited

U.S. PATENT DOCUMENTS

| | | | |
|---|---|---|---|
| 3,802,257 A | 4/1974 | Jorenda et al. ................ 73/129 |
| 3,808,593 A | 4/1974 | Kopernik et al. | |
| 3,975,706 A | 8/1976 | Kato .......................... 200/61.4 |
| 4,182,981 A | * 1/1980 | Shum et al. ............ 340/870.13 |
| 4,474,274 A | 10/1984 | Lutz et al. .................. 188/1.11 |
| 4,890,697 A | 1/1990 | Fischer et al. .............. 188/1.11 |
| 5,015,990 A | * 5/1991 | Reede .......................... 340/454 |
| 5,632,359 A | 5/1997 | Camps et al. ............... 188/1.11 |
| 5,637,794 A | 6/1997 | Hanisko ....................... 73/121 |
| 5,975,250 A | 11/1999 | Brandmeier et al. ........ 188/1.11 |
| 6,067,025 A | 5/2000 | Chiu et al. ................ 340/686.5 |

FOREIGN PATENT DOCUMENTS

FR 2574508 * 6/1986 ................. 340/454

* cited by examiner

*Primary Examiner*—Brent A. Swarthout
(74) *Attorney, Agent, or Firm*—Reising, Ethington, Barnes, Kisselle, Learman & McCulloch, P.C.

(57) ABSTRACT

A brake wear sensor in which a body of electrical insulating material mounts a pair of electrically conductive plates such that edges of the plates are spaced from each other at a surface of the body. The body has an external thread adapted to be received within an internally threaded opening in a brake pad to position the surface of the body and the edges of the plates adjacent to a braking surface of the brake pad. Electrical circuitry is connected to the plates for monitoring wear at the surface of the body as a function of changes in capacitance between the plates, and a gauge is coupled to the circuitry for indicating brake wear as a function of such changes in capacitance.

18 Claims, 2 Drawing Sheets

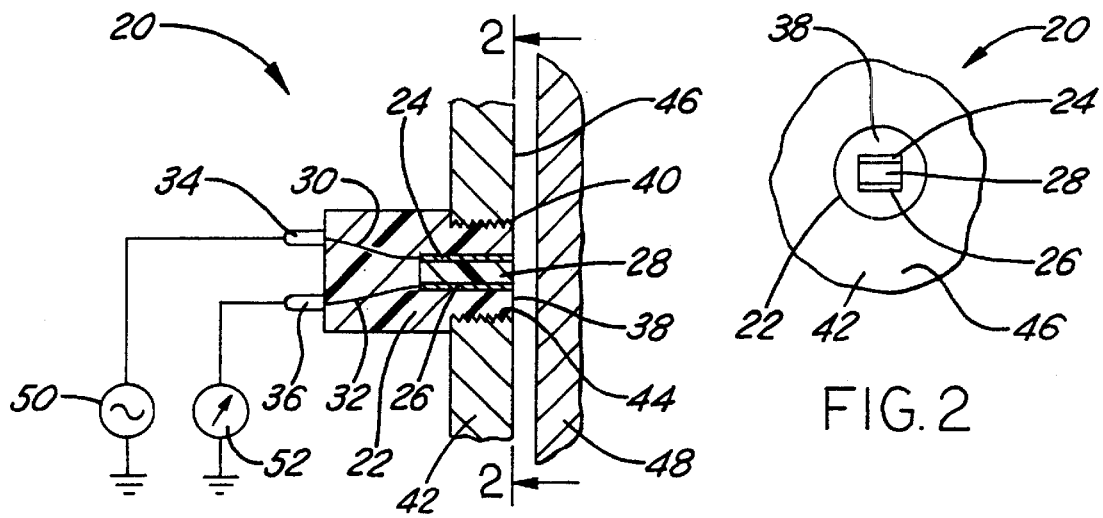
FIG. 1
FIG. 2
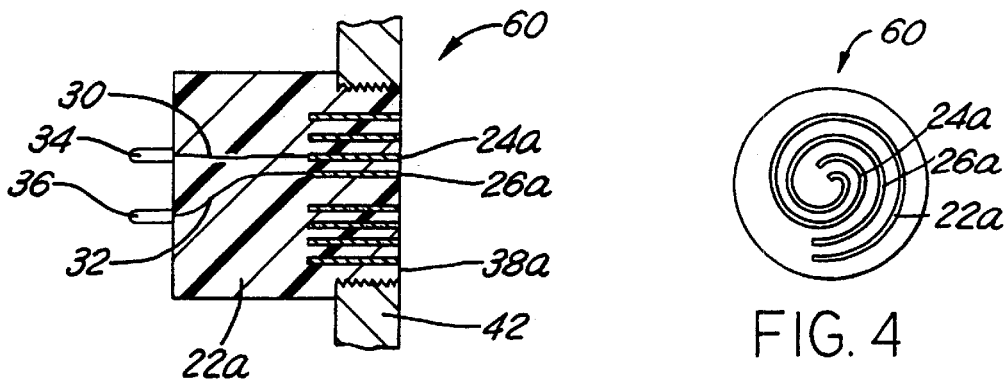
FIG. 3
FIG. 4
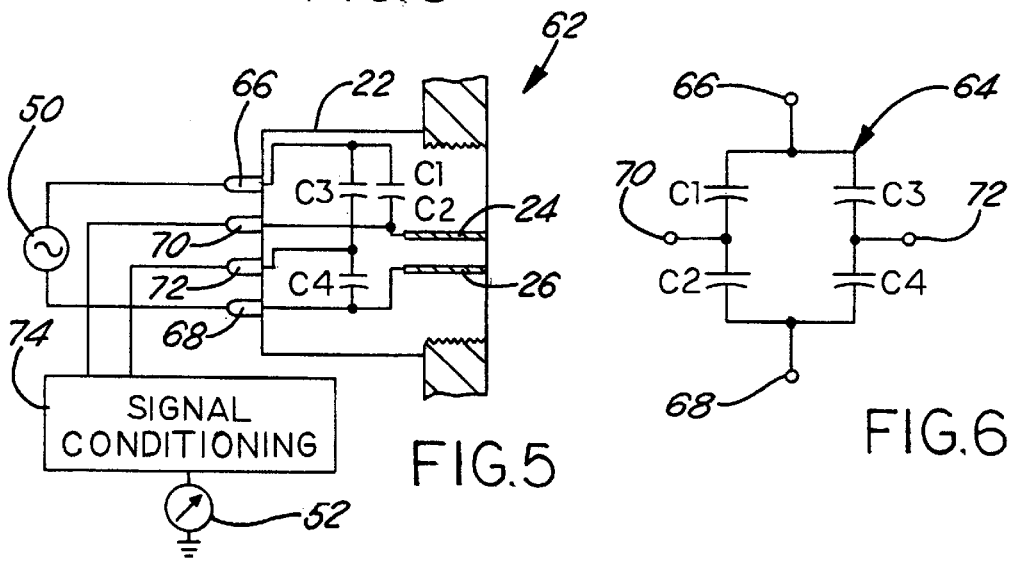
FIG. 5
FIG. 6

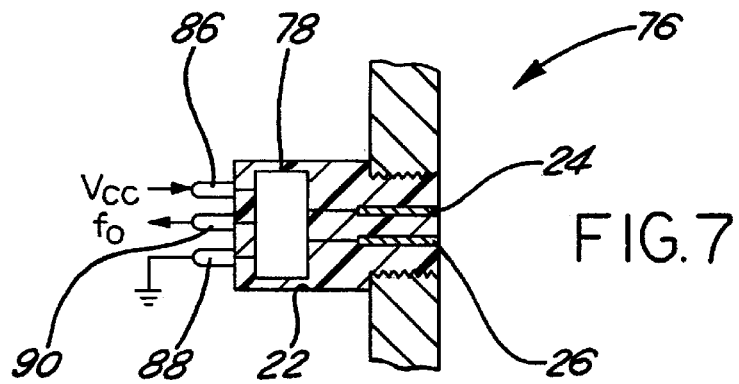
FIG. 7
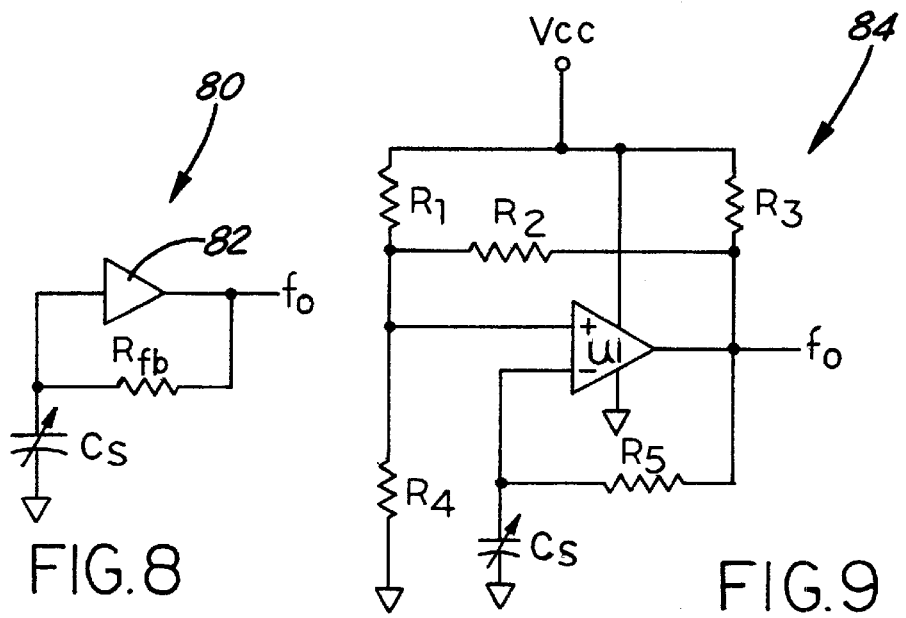
FIG. 8
FIG. 9
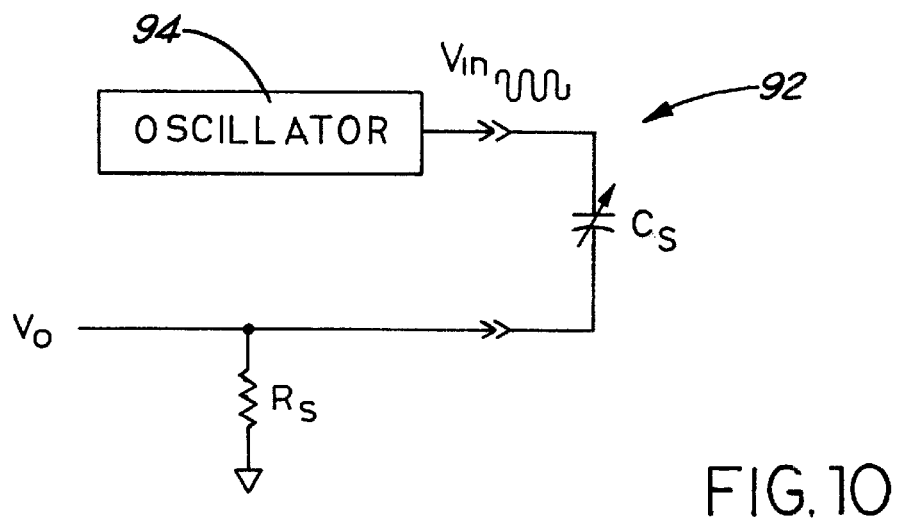
FIG. 10

BRAKE WEAR SENSOR

The present invention is directed to a sensor for monitoring brake wear, particularly in automotive vehicles.

BACKGROUND AND SUMMARY OF THE INVENTION

It is a general object of the present invention to provide a simple and inexpensive sensor for monitoring brake wear, either drum-type or disc-type brake wear, in an automotive vehicle environment.

A brake wear sensor in accordance with the present invention includes a body mounting a pair of electrically conductive plates at positions spaced from each other and with each plate having an edge adjacent to a surface of the body. The body includes facility for mounting the body to a brake pad so as to bring the surface of the body, adjacent to which the plate edges are disposed, into position for wearing contact with a brake rotor. Electrical leads and contacts provide for electrical connection to circuitry for monitoring brake wear as a function of changes in capacitance between the plates. That is, the edges of the sensor plates and the surface of the body wear simultaneously with wear at the braking surface of the brake pad, so that changes in electrical capacitance between the sensor plates provide a direct indication of brake pad wear.

In the preferred embodiment of the invention, the body is of insulating material and has an external thread that is adapted to be received within an internally threaded opening in a brake pad to position the wear surface of the body adjacent to the braking surface of the brake pad. In alternative embodiments of the invention, the sensor plates may comprise either flat parallel plates or concentric spiral plates spaced from each other by insulating material. This insulating material may comprise a portion of the insulating body molded between the plates, or separate dielectric material positioned between the plates prior to molding the plates into the body.

Electrical circuitry is connected to the sensor plates for monitoring brake wear as a function of changes in capacitance between the plates. In various embodiments of the invention, this electrical circuitry may include a capacitance bridge in which the plates are connected as one arm of the bridge, a variable frequency oscillator in which the plates are connected as a frequency control component of the oscillator, or an oscillator having an output coupled to the plates such that voltage drop across the plates varies as a function of capacitance between the plates. In the preferred embodiments, at least a portion of the electrical circuitry is disposed in the body of the sensor, preferably by being molded into the body of the sensor simultaneously with the plates. A dashboard gauge may be connected to the electrical circuitry for providing a continuous indication of brake wear to a vehicle operator.

BRIEF DESCRIPTION OF THE DRAWING

The invention, together with additional objects, features and advantages thereof, will be best understood from the following description, the appended claims and the accompanying drawings in which:

FIG. 1 is a schematic diagram of a brake wear sensor in accordance with one presently preferred embodiment of the invention;

FIG. 2 is an elevational view of the sensor in FIG. 1, taken substantially along the line 2—2 in FIG. 1;

FIG. 3 is a fragmentary sectional view that illustrates a modification to the brake wear sensor of FIG. 1;

FIG. 4 is an elevational view similar to that of FIG. 2 but illustrating the sensor of FIG. 3;

FIG. 5 is an electrical schematic diagram of a brake wear sensor connected to electrical monitoring and indicating circuitry;

FIG. 6 is a schematic diagram of the capacitance bridge in which the sensor of FIG. 5 is connected;

FIG. 7 is a fragmentary sectional view similar to those of FIGS. 1 and 3 but indicating a modification in which all or part of the monitoring circuitry is mounted within the sensor body;

FIG. 8 is an electrical schematic diagram of an electrical circuit for monitoring sensor capacitance;

FIG. 9 is an electrical schematic diagram of a modified sensor monitoring circuit; and FIG. 10 is an electrical schematic diagram of a further modification to the circuitry for monitoring the brake wear sensor in accordance with the present invention.

DETAILED DESCRIPTION OF THE PREFERRED EMBODIMENTS

FIGS. 1 and 2 illustrate a brake wear sensor 20 in accordance with a presently preferred embodiment of the invention as comprising a body 22 in which a pair of electrically conductive plates 24, 26 are embedded. Electrically conductive plates 24, 26 in the embodiment illustrated in FIGS. 1 and 2 comprise flat parallel plates separated from each other by a block 28 of dielectric insulating material. Body 22 is preferably of insulating material, such as molded plastic, into which the preformed assembly of plates 24, 26 and dielectric block 28 is molded. Alternatively, body 22 may be of non-insulating material, and plates 24, 26 may be coated with suitable insulating material so as to insulate the plates from the material of body 22. A pair of conductors 30, 32 extend from plates 24, 26 to a pair of contacts 34, 36 molded into the back face of body 22. The opposing end of body 22 is of cylindrical contour, having an external thread 40 and a flat end face 38 perpendicular to the axis of thread 40 and at which parallel edges of plates 24, 26 are exposed. Plates 24, 26 are preferably oriented to be perpendicular to surface 38. A brake pad 42 has an internally threaded opening 44 into which body 22 is threaded so as to bring face 38 of body 22 into position contiguous with (i.e., a continuation of) the braking surface 46 of pad 42. A brake rotor 48 has a surface opposed to braking surface 46. Rotor 48 may comprise a drum-type rotor, with braking surface 46 being of generally cylindrical contour. Alternatively, and more preferably, rotor 48 comprises a disc-type rotor having a flat braking surface parallel to and spaced from the flat braking surface 46 of pad 42, and with surface 38 coplanar with surface 46.

In operation, with sensor 20 mounted to brake pad 42 as illustrated in FIG. 1, use of brake pad 42 causes wear at braking surface 46, and corresponding wear at surface 38 of sensor 20. This wear includes abrasion of the edges of plates 24, 26 disposed at surface 38, so that the wear of the brake pad and sensor body causes a change (reduction) of the electrical capacitance between plates 24, 26. One contact 34 is connected to a source 50 of A.C. power and the other contact 36 is connected to a suitable gauge 52. As brake pad 42 and sensor body 22 wear, a corresponding indication is provided at gauge 52. The operator replaces pad 42 at a suitable wear level. The wear characteristics of sensor body 22 and plates 24, 26 should be not greater than the wear characteristics of brake pad 42. In other words, sensor body 22 and plates 24, 26 should wear as if they were part of pad 42 to provide an accurate indication of brake wear at gauge 52.

FIGS. 3 and 4 illustrate a modified sensor 60, in which plates 24a, 26a are of ribbon-like construction, being spirally configured and maintained at uniform parallel spacing within respect to each other by the insulating material of body 22a. It will thus be noted in the embodiment of FIGS. 3 and 4 that the insulating material of body 22a extends between plates 24a, 26a, rather than there being a separate dielectric block 28 disposed therebetween. The same modification could be implemented in the embodiment of FIGS. 1–2. The spiral plate configuration of FIGS. 3 and 4 has the advantage over the parallel plate configuration of FIGS. 1 and 2 that there is a greater magnitude of capacitance change between the sensor plates for a given amount of wear at surface 38a.

FIGS. 5 and 6 illustrate a modified sensor 62, in which sensor plates 24, 26 (or 24a, 26a) are connected as one arm C2 of a capacitance bridge 64. The other arms of capacitance bridge 64 include capacitors C1, C3 and C4. The series combinations of capacitors C1, C2 and C3, C4 are connected in parallel between terminals 66, 68 of sensor 62. The junction of capacitors C1, C2 is connected to a terminal 70, and the junction of capacitors C3, C4 is connected to a terminal 72. A.C. source 50 is connected between terminals 66,68, and terminals 70, 72 provide an output of bridge circuit 64 to signal conditioning circuitry 74. Signal conditioning circuitry 74 has an output connected to gauge 52 to provide an indication of brake wear as a function of a change in capacitance at capacitor C2, while the other capacitors of bridge 64 remain fixed. Capacitors C1, C3 and C4, terminals 66–72 and the associated conductors preferably are molded into body 22 (or 22a) of sensor 62 so that all of the bridge capacitors are subjected to the same temperature and other environmental conditions.

FIG. 7 illustrates a sensor 76, in which at least a portion of the electronic circuitry 78 is embedded in (e.g., molded into) sensor body 22 (or 22a) and electrically connected within the body to sensor plates 24, 26 (or 24a, 26a). Sensor circuitry 78 may include a variable frequency oscillator 80 (FIG. 8), in which the sensor capacitor $C_s$ formed by plates 24, 26 (or 24a, 26a) is connected as a frequency varying component to the input of an amplifier 82. FIG. 9 illustrates a more elaborate variable frequency oscillator 84, in which sensor capacitor $C_s$ . is connected as a frequency control component to an open collector comparator U1. In either circuit, the output frequency $f_o$ is proportional to the capacitance of sensor capacitor $C_s$. Input voltage Vcc, electrical ground and output signal $f_o$ are applied to or appear at terminals 86, 88, 90 of sensor 76 as illustrated in FIG. 7. FIG. 10 illustrates a modified embodiment 92, in which an oscillator 94 external to the sensor is connected to sensor capacitor $C_s$. The ratio of output voltage $V_o$, across resistor $R_s$, to input voltage $V_{in}$ is proportional to sensor capacitance $C_s$. Thus, the output voltage is proportional to impedance at the sensor capacitor, and may be conditioned and fed to gauge 52 (FIGS. 1 and 5).

There has thus been disclosed a brake wear sensor that fully satisfies all of the objects and aims previously set forth. Among other advantages of the invention are: reduced susceptibility to thermal effects, mechanical durability, provision of a continuous measurement of brake pad wear (as distinguished from measurement in discrete steps), reduced expense, and ease of replaceability, for example when the brake pads are being replaced. A number of presently preferred embodiments of the invention have been disclosed, and various additional modifications and variations have been described. Other modifications and variations will readily suggest themselves to persons of ordinary skill in the art in view of the foregoing description. The invention is intended to embrace all such modifications and variations as fall within the spirit and broad scope of the appended claims.

What is claimed is:

1. A brake wear sensor that comprises:
a pair of electrically conductive plates,
a body mounting said plates spaced from and insulated from each other, and with each said plate having an edge adjacent to a surface of said body,
said plates being disposed in said body in spiral parallel orientation about an axis perpendicular to said surface of said body,
said body including means for mounting said body to a brake pad so as to bring said surface into contact with a brake rotor, and
means for electrically connecting said plates to electrical circuitry for monitoring wear at said surface as a function of changes in capacitance between said plates.

2. The sensor get forth in claim 1 wherein said means for mounting said body comprises an external thread on said body adapted to be received within an internally threaded opening in a brake pad to position said surface of said body adjacent to and contiguous with a braking surface of the brake pad.

3. The sensor set forth in claim 1 wherein said body is of insulating material that extends between said plates holding said plates at parallel uniform spacing from each other.

4. The sensor set forth in claim 1 further comprising insulating material disposed between said plate and holding said plates at parallel uniform spacing from each other.

5. The sensor set forth in claim 1 wherein said edges of said plates are disposed at said surface.

6. The sensor set forth in claim 1 further comprising electrical circuitry connected to said plates for monitoring brake wear as a function of changes in capacitance between said plates.

7. The sensor set forth in claim 6 wherein at least a portion of said electrical circuitry is disposed in said body.

8. The sensor set forth in claim 6 wherein said electrical circuitry comprises a capacitance bridge, in which said plates are connected as one arm of said bridge.

9. The sensor set forth in claim 6 wherein said electrical circuitry comprises a variable frequency oscillator, in which said plates are connected as a frequency control component of said oscillator.

10. The sensor set forth in claim 6 wherein said electrical circuitry comprises an oscillator having an output coupled to said plates such that voltage drop across said plates varies as a function of capacitance between said plates.

11. A brake wear sensor that comprises:
a pair of electrically conductive plates,
a body mounting said plates spaced from and insulated from each other, and with each said plate having an edge adjacent to a surface of said body,
said body including means for mounting said body to a brake pad so as to bring said surface into contact with a brake rotor,
means for electrically connecting said plates to electrical circuitry for monitoring wear at said surface as a function of changes in capacitance between said plates, and electrical circuitry connected to said plates for monitoring brake wear as a function of changes in capacitance between said plates, said electrical circuitry comprising a variable frequency oscillator in which said plates are connected as a frequency control component of said oscillator.

12. The sensor setforth in claim 11 wherein said plates are disposed in said body in flat parallel orientation perpendicular to said surface of said body.

13. The sensor set forth in claim 11 wherein said plates are disposed in said body in spiral parallel orientation about an axis perpendicular to said surface of said body. disposed at said surface.

14. A brake wear sensor that comprises:

a pair of electrically conductive plates, a body mounting said plates spaced from and insulated from each other, and with each said plate having an edge adjacent to a surface of said body, said body including means for mounting said body to a brake pad so as to bring said surface into contact with a brake rotor, means for electrically connecting said plates to electrical circuitry for monitoring wear at said surface as a function of changes in capacitance between said plates, and electrical circuitry connected to said plates for monitoring brake wear as a function of changes in capacitance between said plates, said electrical circuitry comprising an oscillator having an output coupled to said plates such that voltage drop across said plates varies as a function of capacitance between said plates.

15. The sensor set forth in claim 14 wherein said plates are disposed in said body in flat parallel orientation perpendicular to said surface of said body.

16. The sensor set forth in claim 14 wherein said plates are disposed in said body in spiral parallel orientation about an axis perpendicular to said surface of said body.

17. A brake wear sensor that comprises:

a pair of electrically conductive plates, a body of electrical insulating material mounting said plates such that edges of said plates are spaced from each other at a surface of said body, said body in having an external thread adapted to be received within an internally threaded opening in a brake pad to position said surface and said edges of said plates adjacent to a braking surface of the brake pad, said plates being disposed in said body in spiral parallel orientation about an axis perpendicular to said surface of said body, electrical circuitry connected to said plates for monitoring wear at said surface of said body as a function of changes in capacitance between said plates, and means coupled to said circuitry for indicating brake wear as a function of said changes in capacitance.

18. The sensor set forth in claim 17 wherein at least a portion of said electrical circuitry is disposed in said body.

* * * * *